United States Patent Office 3,591,578
Patented July 6, 1971

3,591,578
PROCESS FOR TREATING POLYSACCHARIDES PRODUCED BY FERMENTATION
Pierre Colin and Victor Guibert, Melle, Deux-Sevres, France, assignors to Melle-Bezons, Melle, Deux-Sevres, France
No Drawing. Filed Sept. 6, 1968, Ser. No. 758,102
Claims priority, application France, Apr. 29, 1968, 484
Int. Cl. C07c *47/18*
U.S. Cl. 260—209                                                 6 Claims

ABSTRACT OF THE DISCLOSURE

In the tretament of polysaccharides obtained by fermentation in a must or broth and from which the polysaccharide is recovered by precipitation, the improvement which comprises heating the broth prior to precipitation at a temperature within the range of 80° to 130° C. for a time within the range of 10 to 120 minutes while at a pH within the range of 6.3 to 6.9.

---

The present invention relates to a process for the treatment of polysaccharides produced by fermentation.

Polysaccharide gums produced through glucide fermentation by microorganisms, especially microorganisms of the type Xanthomonas, such as *Xanthomonas campestris*, are heteropolysaccharides in which the principal components are glucose, mannose and glucuronic acid. These heteropolysaccharides may contain acetyl groups and another component thereof may be pyruvic acid. The physical properties of these gums in the rheologic field are very special. The viscosity of their colloidal dispersions or sols is very stable in the presence of salts or inorganic or organic acids.

The pseudo-plastic character of these sols demands that their viscosity be defined under well established conditions. For all viscosity measurements referred to herein, use was made of a Brookfield viscosimeter LVT, at speeds of 30 r.p.m., needle No. 3.

U.S. Pat. No. 3,355,447 teaches that it is possible to avoid degradation in time of sols of polysaccharides produced by fermenttaion and separation through precipitation by the introduction of an alcohol into the fermented must or broth if the must or broth has previously been subjected to heating to a temperature within the range of 60° to 78° C. for about 20 minutes. In accordance with the teachings of the patent, heating to a temperature above 78° C. is undesirable.

It has now been surprisingly found that by carrying out the heating step of the fermented must or broth without previous dilution, at a pH within the range of 6.3 to 6.9 and within a temperature range of 80° to 130° C., for about 10 to 120 minutes, not only is the degradation in time of the polysaccharide subsequently isolated from the must or broth by precipitation avoided, but in addition their rheological characteristics are improved, especially in their acid or salt-containing aqueous sols. In the preferred practice of this invention, the temperature for the heating step is about 95° C. with the pH below 6.8 and heating for about one-half hour. For example, at 85° C. the heating time may advantageously be 2 hours or more whereas, at 120° C. a heating time of 10 minutes is sufficient.

For precipitating the polysaccharide from the fermented must or broth previously heated in accordance with the process of this invention, there are introduced one or more diluents which are effective to cause polysaccharide precipitation, such for example as an alcohol such as methanol, ethanol, isopropanol or tertiary butanol, or acetone or mixtures thereof. In carrying out the present process, it has been found to be especially advantageous to make use of tertiary butanol which avoids the necessity of using, additionally, a solution of an electrolyte such as potassium or sodium chloride. On the other hand, such an electrolyte is necessary to provide an economical precipitation operation when methanol or ethanol is employed as the precipitating diluent. Preferably, the amount of tertiary butanol used is within the range of 0.7 to 1.3 volumes per volume of fermented must or broth. Corresponding volumes of the other diluents may be used.

The following examples are given by way of illustration, but not by way of limitation, of the practice of this invention:

EXAMPLE 1

In a fermentation vat, 50 liters of a must formulated of an aqueous solution of saccharose having a concentration of 20 grams per liter, soya-bean oil cake (4 g. per l.), disodium hydrogen phosphate having 12 mols of water of crystallization (10 g. per l.) and magesium sulfate having 7 mols of water of crystallization (0.25 g. per l.) are fermented by the microorganism *Xanthomonas campestris* with continuous stirring and aeration. After 64 hours fermentation, the sugar has been consumed and the must contains 15 g. per liter of polysaccharides in the form of a sol. The must has a viscosity of 4500 centipoises (cps.) and a pH of 6.5 such that it is unnecessary to adjust its pH before treatment in accordance with the practice of this invention.

By injecting steam into the vat, the must is raised to a temperature of 95° C. within 10 minutes and is maintained at this temperature for one-half hour. The contents of the vat are then transferred within 10 minutes to a vessel having a capacity of 150 liters and provided with a stirring device and a cooling jacket through which water is circulated at a temperature of 14° C. When the vat has been emptied, the temperature of the must in the vessel is 40° C.

60 liters of tertiary butanol are added to the vessel to cause polysaccharide precipitation. After standing for 30 minutes, 100 liters of supernatant liquid are withdrawn and 10 liters of tertiary butanol are poured onto the precipitate in the vessel. After 15 minutes standing, 10 liters of liquid are withdrawn and 10 liters of fresh tertiary butanol are poured on to the precipitate and then the bulk of the precipitate and liquid is subjected to filtration through a wire gauze. There is obtained 4.7 kg. of a fibrous precipitate which is dried for one hour at a temperature of 98° C. 720 g. of dry polysaccharide is finally obtained and ground.

For purposes of comparison, a check-precipitate is prepared in the same manner without previous heating of the fermented must in accordance with the practice of this invention.

Starting with the two precipitates, two series of sols are prepared containing 1% by weight polysaccharides in the following diluents:

A—Water
B—Aqueous solution of NaCl at 5% by weight
C—Aqueous solution of NaCl at 26% by weight
D—Aqueous solution of KCl at 10% by weight
E—Aqueous solution of MgSO₄ at 5% by weight
F—Aqueous solution of NaCl (8% by weight), + CaCl (2.5% by weight)
G—Aqueous solution of HCl at 15% by weight
H—Aqueous solution of H₃PO₄ at 15% by weight
I—Aqueous solution of HOOC—CH₃ at 60% by weight The viscosity of the various sols is measured 24 hours after preparation. The results (in cps.) are given in the following Table I.

TABLE I

|  | A | B | C | D | E | F | G | H | I |
|---|---|---|---|---|---|---|---|---|---|
| Check-must (without previous heating) | 1,640 | 1,580 | 1,540 | 1,600 | 1,620 | 1,580 | 600 | 1,400 | 1,600 |
| Previously heated must | 2,200 | 2,400 | 2,600 | 2,480 | 2,600 | 2,600 | 2,900 | 2,200 | 2,480 |

It will be seen that there is a significant difference between the two series of sols, especially with respect to the viscosity figure in the presence of HCl.

EXAMPLE 2

The viscosity of polysaccharide sols having a concentration of 1% by weight in the various diluents of Example 1 was measured. To compare the results with one another, use is made, on the one hand, of a check-precipitate of polysaccharides obtained by precipitation without previous heating of the fermented must and, on the other hand, precipitates obtained after previous heating of the same fermented must at various temperatures and for various times. The must was produced by fermentation of a saccharose solution with Xanthomonas compestris and it had a pH of 6.8 so that it was not necessary to adjust the pH before treatment in accordance with the present invention.

The check-precipitate was obtained as follows: 20 g. per liter of potassium chloride was added to the fermented must and then 0.7 volume of tertiary butanol per volume of must was introduced for precipitation. The polysaccharide precipitate was separated by filtration through a fine wire gauze and then dehydrated by treatment with tertiary butanol and dried for one hour at a temperature of 98° C. and then ground.

To obtain the other precipitates in accordance with the practice of this invention, the operations were carried out in a similar way but the musts were previously heated to temperatures indicated in Tables II, III and IV and were maintained at the selected temperatures for the times indicated. The heating steps were carried out in an autoclave by introduction of live steam. The autoclave was provided with a jacket through which cold water was circulated to accelerate cooling after the heating step.

The viscosity measurements were carried out with samples of 300 g. of sols containing 3 g. of polysaccharides. The sols reach stable viscosity figures after a time of 1 to 2 hours. However, to avoid variations resulting from higher or lower swelling quickness, the viscosities (cps.) in the tables below were obtained 24 hours after preparation of the sol.

Table II gives the average figures of the determinations effected on the polysaccharide sols in aqueous solutions having the following formulations:

Sodium chloride at 5% by weight
Sodium chloride at 26% by weight
Potassium chloride at 10% by weight
Magnesium sulfate at 5% by weight
NaCl (8%)+CaCl₂ (2.5% by weight)
Acetic acid at 60% by weight Table III gives the results of the determinations made on polysaccharide sols in aqueous solutions of 15% by weight hydrochloric acid.

Table IV gives the average figures for the determinations made on polysaccharide sols in distilled water and in an aqueous solution of 15% by weight phosphoric acid.

TABLE II

| Heating time of the must | Heating temperature of the must (° C.) | | | | |
|---|---|---|---|---|---|
|  | 85 | 95 | 105 | 115 | 125 |
| None | Check-polysaccharide: 1,680 cps. | | | | |
| 10 minutes | 2,580 | 2,600 | 2,520 | 2,450 | 2,380 |
| 30 minutes | 2,580 | 2,480 | 2,480 | 2,470 | 2,060 |
| 60 minutes | 2,620 | 2,520 | 2,140 | 2,100 |  |
| 120 minutes | 2,530 | 2,240 | 2,120 | 2,040 |  |

TABLE III

| Heating time of the must | Heating temperature of the must (° C.) | | | | |
|---|---|---|---|---|---|
|  | 85 | 95 | 105 | 115 | 125 |
| None | Check-polysaccharide: 600 cps. | | | | |
| 10 minutes | 1,720 | 2,040 | 1,840 | 1,720 | 1,620 |
| 30 minutes | 1,800 | 1,720 | 1,740 | 1,760 |  |
| 60 minutes | 2,300 | 1,800 | 1,780 | 1,480 |  |
| 120 minutes | 2,000 | 1,120 | 1,200 | 1,000 |  |

TABLE IV

| Heating time of the must | Heating temperature of the must (° C.) | | | | |
|---|---|---|---|---|---|
|  | 85 | 95 | 105 | 115 | 125 |
| None | Check-polysaccharide: 1,540 cps. | | | | |
| 10 minutes | 2,500 | 2,000 | 1,980 | 1,960 | 1,800 |
| 30 minutes | 2,000 | 1,980 | 1,920 | 1,800 | 1,740 |
| 60 minutes | 2,220 | 1,920 | 2,100 | 2,000 | 1,680 |
| 120 minutes | 2,180 | 1,640 | 1,660 | 1,680 |  |

The results set forth in the foregoing tables verify that the polysaccharides processed in accordance with the practice of this invention, when in the form of aqueous sols, can be heated to relatively high temperatures without any of the expected detrimental consequences with respect to the rheologic properties of the sols and also with improvements in such properties, as compared with the check-polysaccharides especially in the case of sols in hydrochloric acid medium and also sols in various acid or salt-containing media.

It will be apparent from the foregoing that we have provided a new and improved method in the treatment of polysaccharides produced by fermentation with microorganisms whereby polysaccharides having improved rheologic characteristics and resistance to degradation are secured.

It will be understood that changes may be made in the details of formulation and operation without departing from the spirit of the invention, especially as defined in the following claims.

We claim:
1. In a process for improving the viscosity of polysaccharides obtained by precipitation from a fermented must or broth in which they have been produced by fermentation, the improvement wherein the fermented must or broth, prior to precipitation, and without previous dilution is heated to a temperature within the range of 80° to 130° C. for a time within the range of 10 to 120 minutes at a pH within the ranges of 6.3 to 6.9.

2. A process as claimed in claim 1 in which the must or broth is at a pH within the range of 6.3 to 6.8.

3. A process as claimed in claim 1 in which the must or broth is heated for about one-half hour.

4. A process as claimed in claim 1 in which the must or broth is heated to a temperature of about 95° C. for about one-half hour.

5. A process as claimed in claim 1 in which the must or broth is at a pH within the range of 6.3 to 6.8.

6. A process as claimed in claim 1 in which the must or broth is heated to a temperature of about 95° C. for about one-half hour at a pH between 6.3 to 6.8.

References Cited

UNITED STATES PATENTS

| | | | |
|---|---|---|---|
| 2,767,167 | 10/1956 | Opie et al. | 260—209 |
| 2,818,357 | 12/1957 | Ziegler et al. | 260—209 |
| 3,094,517 | 6/1963 | Stanley | 260—209 |
| 3,146,200 | 8/1964 | Goldstein et al. | 260—209 |

ELBERT L. ROBERTS, Primary Examiner

J. R. BROWN, Assistant Examiner

U.S. Cl. X.R.

195—28